United States Patent [19]
Frackenpohl et al.

[11] Patent Number: 5,704,432
[45] Date of Patent: Jan. 6, 1998

[54] COUPLING AND CENTERING DEVICE FOR ATTACHMENT TO A JOURNAL USED IN CONNECTING THE LOWER STEERING ARM OF A THREE POINT HITCH OF A TRACTOR

[75] Inventors: Alfred Frackenpohl, Lohmar; Herbert Coenen, Hennef, both of Germany

[73] Assignee: GKN Walterscheid GmbH, Lohmar, Germany

[21] Appl. No.: 344,492

[22] Filed: Nov. 23, 1994

[30] Foreign Application Priority Data

Nov. 26, 1993 [DE] Germany ............... 43 40 240

[51] Int. Cl.⁶ ..................................... A01B 51/00
[52] U.S. Cl. ................. 172/272; 172/439; 280/461.1
[58] Field of Search ..................... 172/272, 450, 172/439, 273, 274, 275; 403/361, 920, 263, 728, 703; 280/461.1, 504

[56] References Cited

U.S. PATENT DOCUMENTS

| | | | |
|---|---|---|---|
| 2,912,257 | 11/1959 | Du Shane | 280/460 |
| 3,434,737 | 3/1969 | Bailey et al. | 280/504 |
| 3,561,788 | 2/1971 | Carlson et al. | 280/461.1 |
| 4,039,203 | 8/1977 | Kunze et al. | 280/515 |
| 4,193,611 | 3/1980 | Fisk | 280/504 X |
| 4,340,240 | 7/1982 | Anderson | 280/461.1 |
| 4,619,543 | 10/1986 | Vollmer et al. | 403/114 |
| 4,865,134 | 9/1989 | Rugen et al. | 172/450 |
| 4,917,406 | 4/1990 | Herchenbach et al. | 280/455.1 |
| 4,944,354 | 7/1990 | Langen et al. | 172/272 X |
| 4,948,287 | 8/1990 | Herchenback et al. | 403/13 |
| 5,009,443 | 4/1991 | Howatt | 172/272 X |
| 5,263,734 | 11/1993 | Coenen et al. | 280/479.1 |
| 5,429,196 | 7/1995 | Williams | 172/439 |
| 5,441,117 | 8/1995 | Fartmann et al. | 280/461.1 X |
| 5,497,835 | 3/1996 | Laubner et al. | 172/272 |

FOREIGN PATENT DOCUMENTS

| | | |
|---|---|---|
| 1957228 | 5/1971 | Germany . |
| 2166036 | 4/1986 | United Kingdom . |

*Primary Examiner*—Terry Lee Melius
*Assistant Examiner*—Victor Batson
*Attorney, Agent, or Firm*—Harness, Dickey & Pierce, P.L.C.

[57] ABSTRACT

A coupling and centering device is attached to a journal (38) of a carrying frame (37) of an agricultural implement. The coupling and centering device has a catching ball (7) and a catching profile (14). The catching profile (14) has a sleeve (15) and a catching plate (25) which are connected to one another. The sleeve (15), in the fitted condition, enters a bore step (12) of the catching ball. The catching plate (25) is arranged relative to the sleeve (15) such that the transverse bore (19), for receiving the lynch pin, is arranged in the region of the wall of the catching plate (25). Thus, in view of a predetermined length of the journal (38) and the provision of the fixing bore (39), the greatest possible guiding length of the sleeve (15) is achieved on the journal (38). In this way, the strength of the connection is affected positively.

3 Claims, 2 Drawing Sheets 5,704,432

COUPLING AND CENTERING DEVICE FOR ATTACHMENT TO A JOURNAL USED IN CONNECTING THE LOWER STEERING ARM OF A THREE POINT HITCH OF A TRACTOR

BACKGROUND OF THE INVENTION

The invention relates to a coupling and centering device to be attached to a journal of an agricultural implement. The coupling connects to a coupling hook, especially of the lower steering arm of a three-point attaching device of a tractor. The coupling has a catching ball which has a spherical shape and includes a bore by means of which it may be slipped onto the journal of the agricultural implement. The coupling includes a catching profile having a catching plate with at least one conical face, which constitutes the centering face, and a sleeve with a central bore to attach on the journal. The coupling also includes a pin which may be passed transversely through a fixing bore of the journal and through a transverse bore of the sleeve. The pin serves to fix both the catching ball and the catching profile on the journal. The sleeve, in its fitted condition, axially projects into a bore step of the catching ball. The catching plate is secured to the sleeve.

A coupling and centering device is described in U.S. Pat. No. 2,912,257. The disadvantage of the described embodiment is that in view of the catching plate enclosing the sleeve and journal around 360°, it is necessary to arrange the pin to permit only a short guiding and holding length of the catching profile on the journal. In consequence, the strength of the connection is reduced when the coupling hook of the lower steering arm of the tractor initially engages the catching plate of the coupling and centering device. As a result, there is a risk of the connection being unfastened and of losing the implement. DE 38 31 677 C1, issued Dec. 7, 1989 describes a coupling and centering device where a tubular sleeve projects into a hollow plate metal catching ball. The sleeve portion which extends into the catching ball is radially expanded. It is the purpose of the sleeve to support and axially hold the catching ball in a force-free way. However, in view of the methods available, this can only be achieved at great expense. Even slight deviations may lead to the catching ball either not being supported and thus being deformed or causing the catching ball to jam on the sleeve. Furthermore, the sleeve is provided with a transverse bore for a pin and, in addition, it may be provided with a sector-shaped catching plate.

Coupling and centering devices of the above-mentioned type, on the one hand, serve to establish a connection between the implement and tractor where the coupling hooks of the lower steering arms of the tractor each receive and lock a catching ball and, on the other hand, serve as a coupling aid to establish the connection. The catching plate serves to align the coupling hook relative to the catching ball when the tractor driver moves the tractor close to the implement to be coupled. The length of the journals at the implement on which the coupling and centering device is received is specified in DIN 9674 (July 1983 edition) and in ISO 11001 (October 1993 edition) and in ISO 730 (April 1990 edition) and therefore cannot be changed.

SUMMARY OF THE INVENTION

It is an object of the invention to improve the holding means of the coupling and centering device so that the forces applied during the coupling operation are received more advantageously and that the assembling and dismantling procedure is simplified.

In accordance with the invention, the objective is achieved by providing a catching plate in the form of a sector, which extends over part of the circumference of the sleeve. The catching plate, with reference to the axis of the transverse bore of the sleeve, is arranged so as to be centered and uniformly distributed around the axis of the central bore. The catching plate adjoins the sleeve in the region of the transverse bore. The catching plate leaves open a first aperture of the transverse bore to insert a pin. In the region of a second aperture of the transverse bore of the sleeve, the catching plate is provided with a through-aperture to allow the end of the pin to enter. The catching plate and the sleeve constitute separate components which are welded to one another. The bore serves to rotatably support the catching ball of the journal of the implement.

The advantage of this embodiment is that, when initially engaging the coupling hook, the catching plate for centering the coupling hook is at the required distance from the catching ball. The distance also ensures that, in the coupled condition, the necessary freedom of movement exists between the coupling hook and catching ball. Furthermore, the special arrangement of the sleeve relative to the catching plate and catching ball ensures that the catching profile is adequately guided on the journal of the implement. Furthermore, a double connection is achieved to secure the coupling and centering device on the journal with the catching ball rotatably supported so that any forces applied, in the fitted condition, by the coupling hook to the catching ball around the journal axis do not adversely affect the fixing of the catching plate.

By providing the catching plate and sleeve as separate components, it is easy to produce the through-aperture. The sleeve enters the catching ball, and enables a greater axial length. Finally, by providing the transverse bore, it is possible to accommodate and protect the pin to secure the coupling and centering device on the journal. By providing the transverse bore and by designing the catching plate in the form of a sector it is possible to insert the pin in a simple way. The end which is loaded for the purpose of pushing out the pin, is protected by the catching plate.

In a preferred embodiment, the sleeve includes a first sleeve portion and a second axially adjoining sleeve portion whose diameter is increased by a step. By reinforcing the sleeve portion in the direction of the journal end, the strength conditions are improved.

A particularly advantageous connection with the journal is achieved by a pin which is provided in the form of a lynch pin and which includes a spring clip which, in the fitted condition, embraces the second sleeve portion. In this way, it is held so that it cannot be lost.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention is diagrammatically illustrated in the drawing wherein.

3

Figure 2:
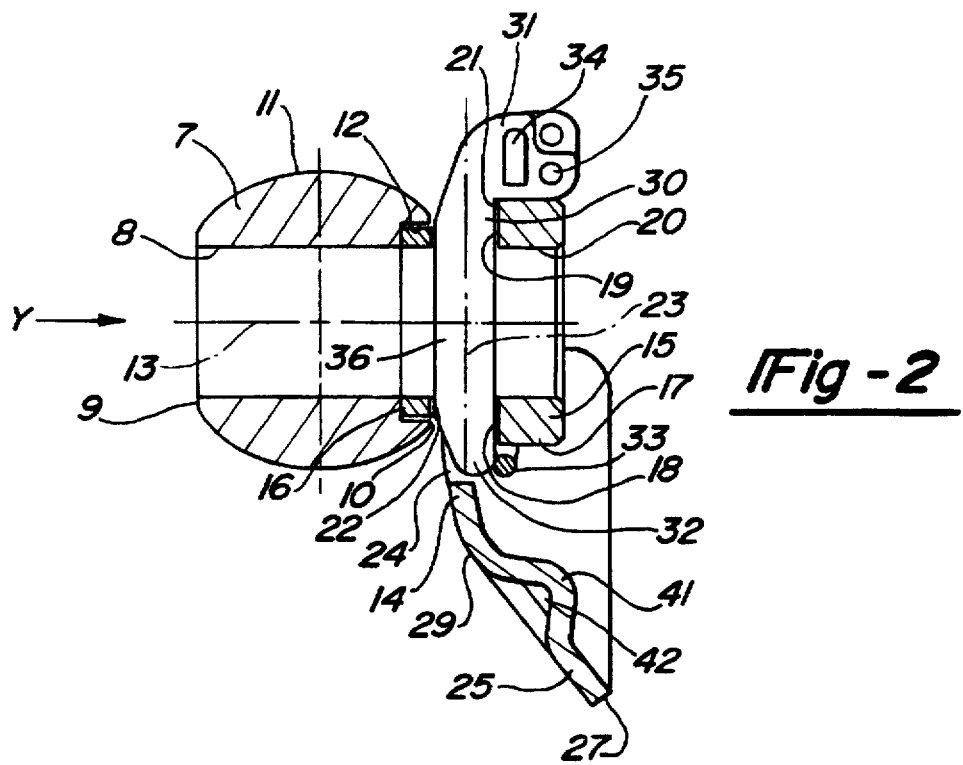
FIG. 2 is a longitudinal section view along the journal axis of the coupling frame of the implement of the detail X shown in the figure, with the journal eliminated and showing only the relationship between the catching ball and catching profile.
Figure 3:
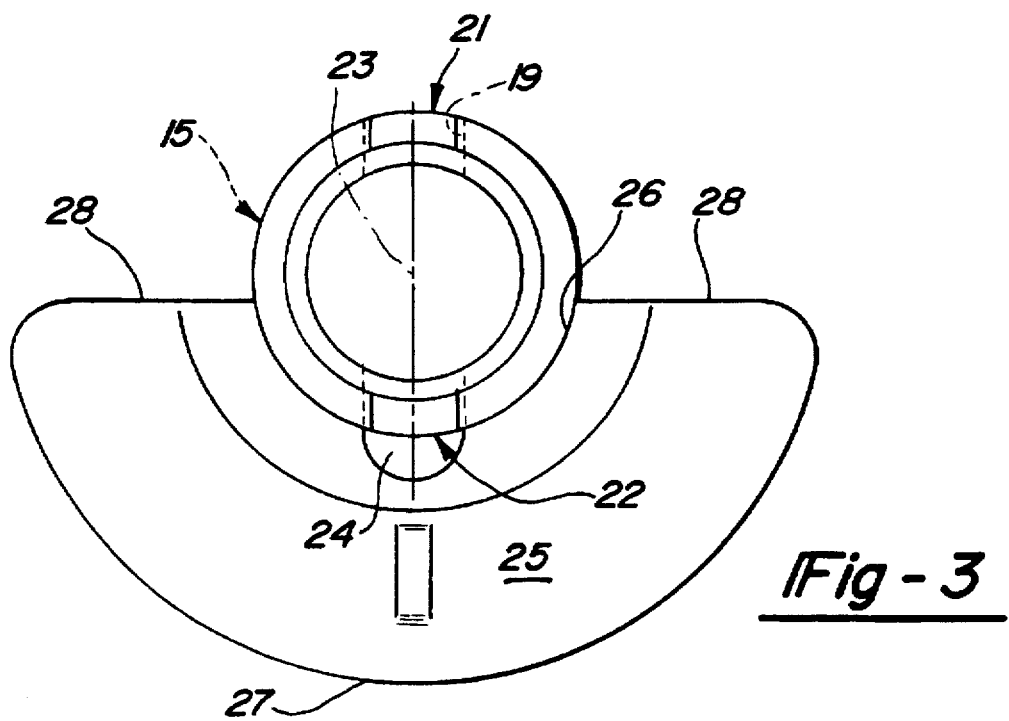

FIG. 3 is a plan view, in the direction of the arrow Y of FIG. 2, of the catching profile, with the catching ball and the lynch pin eliminated.

Figure 4:
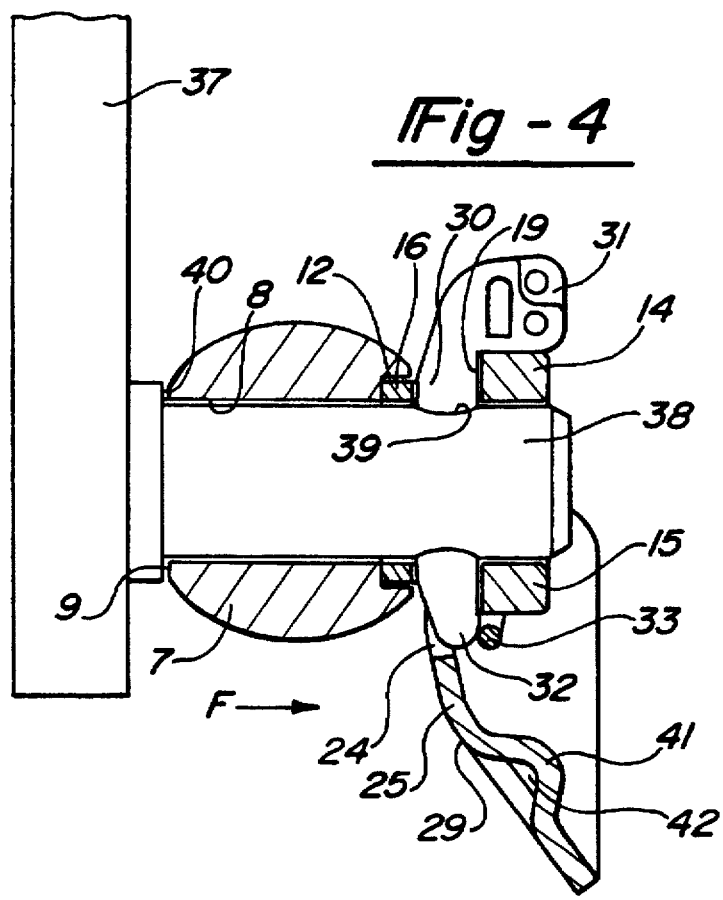

FIG. 4 is a section view of the coupling and centering device of FIG. 2 as arranged on the journal of a carrying frame of the implement.

DETAILED DESCRIPTION OF THE PREFERRED EMBODIMENTS

Figure 1:
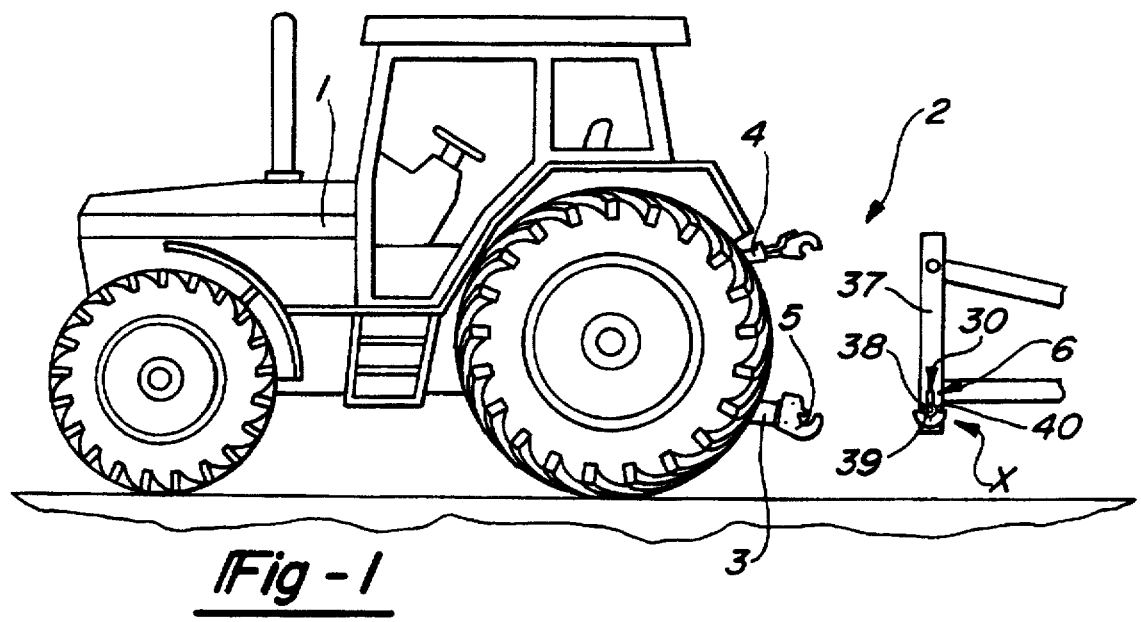
FIG. 1 is a diagrammatic view of a tractor with a three-point attaching device with a carrying frame of an implement, which is to be received by the three-point attaching device.

FIG. 1 shows a tractor 1 with a three-point attaching device 2 at the rear of the tractor. The three-point attaching device 2 includes two lower steering arms 3 which extend parallel to the longitudinal axis and project towards the rear and an upper steering arm 4 arranged centrally thereabove on the longitudinal axis. The two lower steering arms 3 may be raised and lowered by a power lever and at their ends include coupling hooks 5 to connect with the coupling and centering device 6 at the frame of the implement. The upper steering arm 4 is provided with a coupling hook which is comparable to that of the lower steering arm 3.

The detail X referring to the coupling and centering device is illustrated in greater detail in FIG. 4. However, first there follows, with reference to FIGS. 2 and 3, a more detailed description of the embodiment of the coupling and centering device in accordance with the invention with the components associated with the carrying frame of the implement.

FIG. 2 illustrates a catching ball 7 which is designed as a spherical layer and includes a spherical face 11. The catching ball 7 has two end faces 9, 10, with an extending bore 8, defining a bore axis 13. A bore step 12, whose diameter is increased relative to the bore 8, starts from the second end face 10 of the catching ball 7.

The first sleeve portion 16 of a sleeve 15 associated with the catching profile 14 projects into the bore step 12. The first sleeve portion 16, with reference to the axis 13, is axially followed by the second sleeve portion 17 whose diameter is larger than that of the first sleeve portion 16. In the region of transition between the two sleeve portions 16, 17, there is provided a step 18. Towards the step 18 there is arranged a transverse bore 19 which extends transversely through the sleeve 15. The sleeve 15 may also include a continuous diameter. A bore 20 extends through the sleeve 15 axially with reference to the axis 13. The transverse bore 19 includes a first aperture 21 and a diametrically opposed second aperture 22. The axis of the transverse bore 19 has been given the reference number 23.

A catching plate 25 is connected to the sleeve 15. The sleeve 15 and the catching plate 25, together, form the catching profile 14. In the longitudinal section according to FIG. 2, it can be seen that the catching plate 25 extends conically and includes two conical faces, with the outer conical face serving as the centering face 29. Towards the inside of the sleeve 15, the centering face 29 of the catching plate 25 changes into the second conical face. The centering face 29 serves to guide the coupling hook in the direction of the catching ball 7.

FIG. 3 shows that the catching plate 25 is shaped like a sector of a circle and that its inner circumferential face 26 abuts the outer face of the first sleeve portion 16 towards the catching ball end of the transverse bore 20 and is welded to the sleeve 15. In the region of the second aperture 22 of the sleeve 15, the catching plate 25 is provided with an aperture 24. The side edges 28 and the outer circumferential faces delimit the catching plate 25.

In FIG. 2, the sleeve 15 is shown to be associated with a lynch pin 30 which secures the coupling and centering

4 device. The centering device includes the catching ball 7 and the catching profile 14. The lynch pin 30 includes a head 31, a shank 36 and the point 32. The lynch pin 30 also includes a spring clip 33 whose two ends 34, 35 are inserted into bores in the head 31 in an offset way. In FIG. 2, the lynch pin 30 is shown in the fitted condition relative to the sleeve 15. The spring clip 33 is folded in the direction of the point 32 and embraces the second sleeve portion 17 so that the lynch pin 30 is secured against being lost relative to the sleeve 15.

FIG. 4 shows the relationship between the coupling and centering device according to FIG. 2 and the carrying frame 37 of the implement is connected to the tractor 1. A journal 38 includes a collar 40 which projects from the carrying frame 37. A fixing bore 39, provided at a distance from the collar 40, extends transversely through the journal 38 and serves to receive the shank 36 of the lynch pin 30.

The catching ball 7, by means of its bore 8, is slid on to the journal 38. The sleeve 15 is also slid onto the journal 38, so that its first sleeve portion 16 enters the bore step 12 of the catching ball 7. The first end face 9 of the catching ball 7 has been moved close to the collar 40 of the journal 38. The second end face points in the direction of the sleeve 15.

The lynch pin 30 passes through the transverse bore 19 of the sleeve 15 and through the fixing bore 39 of the journal 38 and, by means of its point 32, projects from the second aperture 22 of the bore 19 and enters the through-aperture 24 of the catching plate 25. A gap is formed between the collar 40 and the catching ball 7. The gap enables axial movement of the catching ball on the journal 38 when coupled with the coupling hook 5. It can be seen that the head 31 of the lynch pin 30 is arranged in the region of the first sleeve portion 16 which has been left free from the catching plate 25. It is protected because the coupling hook for providing the connection between the tractor and implement approaches the centering face 29 of the catching plate from below.

This type of assembly permits a long guiding length of the sleeve 15 on the journal 38, with a predetermined journal 38 length. In consequence, any forces applied by the coupling hook to the catching plate 25 are easily accommodated by axial and rotatable movement of the catching ball 7. On the other hand, because the catching ball 7 and the catching profile 14 are separate components, the bearing of the catching ball 7 is not adversely affected. The catching ball 7 is supported rotatably.

Furthermore, in the region of the centering face 29 of the catching plate 25 a cut is provided which is pressed inwardly and forms an inwardly directed eye 42. The eye 42 serves to attach a fixing element which is connected to the spring clip 31 of the lynch pin 30 and prevents the component from being lost. It may be a chain for example.

While the above detailed description describes the preferred embodiment of the present invention, the invention is susceptible to modification, variation, and alteration without deviating from the scope and fair meaning of the subjoined claims.

We claim:

1. A coupling and centering device to be attached to a journal of an agricultural implement and which serves to connect with a coupling hook, especially of the lower steering arm of a three-point attaching device of a tractor, comprising:

a catching ball which has a spherical shaped layer and which includes a bore by which it may be slipped axially onto the journal of the agricultural implement and enable axial movement of the ball on the journal and the bore serves to rotatably support the catching ball on the journal of the implement;

a catching profile, independent of said catching ball, including a catching plate with at least one conical face constituting a centering face and a sleeve with a central bore for attaching on the journal;

a pin which may be passed transversely through a fixing bore of the journal and through a transverse bore of the sleeve and which serves to fix both the catching ball and the catching profile on the journal, with the sleeve, in the fitted condition, axially projecting into a bore step of the catching ball and with the catching plate being secured to the sleeve and creating a gap between the implement and said ball enabling the axial movement of the ball on the journal when coupled with a coupling hook;

said catching plate is provided in the form of a sector, extending over part of the circumference of the sleeve and, with reference to the axis of the transverse bore of the sleeve is centered and uniformly distributed around the axis of the central bore;

the catching plate adjoins the sleeve in the region of the transverse bore;

the catching plate leaves open a first aperture of the transverse bore for inserting the pin; and in the region of a second aperture of the transverse bore of the sleeve, the catching plate includes a through-aperture for allowing an end of the pin to enter, with the catching plate and the sleeve constituting separate components which are secured to one another.

2. A coupling and centering device according to claim 1, wherein the sleeve includes a first sleeve portion and a second axially adjoining sleeve portion whose diameter is increased by a step.

3. A coupling and centering device according to claim 1, wherein the pin is provided in the form of a lynch pin including a spring clip which, in the fitted condition, embraces the sleeve.

* * * * *